United States Patent
Houze

(10) Patent No.: US 9,598,820 B2
(45) Date of Patent: Mar. 21, 2017

(54) MIXTURES OF POLYVINYLAMINES AND OF LIQUID COMPOSITIONS OF CATIONIC AMYLACEOUS MATERIALS AS AGENTS FOR IMPROVING THE DRY STRENGTH OF PAPER AND CARDBOARD

(71) Applicant: ROQUETTE FRERES, Lestrem (FR)

(72) Inventor: Regis Houze, Tourmignies (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 14/407,143

(22) PCT Filed: Jul. 5, 2013

(86) PCT No.: PCT/FR2013/051603
§ 371 (c)(1),
(2) Date: Dec. 11, 2014

(87) PCT Pub. No.: WO2014/006345
PCT Pub. Date: Jan. 9, 2014

(65) Prior Publication Data
US 2015/0184344 A1    Jul. 2, 2015

(30) Foreign Application Priority Data
Jul. 6, 2012 (FR) ..................... 12 56548

(51) Int. Cl.
| | | |
|---|---|---|
| *D21H 21/18* | (2006.01) | |
| *D21H 17/29* | (2006.01) | |
| *D21H 17/56* | (2006.01) | |
| *D21H 17/00* | (2006.01) | |
| *C08L 3/04* | (2006.01) | |
| *C08L 39/02* | (2006.01) | |
| *D21H 17/34* | (2006.01) | |

(52) U.S. Cl.
CPC ............. *D21H 21/18* (2013.01); *C08L 3/04* (2013.01); *C08L 39/02* (2013.01); *D21H 17/29* (2013.01); *D21H 17/34* (2013.01); *D21H 17/56* (2013.01); *D21H 17/72* (2013.01)

(58) Field of Classification Search
CPC ......... D21H 21/18; D21H 17/34; D21H 17/29
USPC .............................. 162/168.2; 524/52
See application file for complete search history.

(56) References Cited

U.S. PATENT DOCUMENTS

| | | | |
|---|---|---|---|
| 6,296,696 B1 | 10/2001 | Letourneau | |
| 2003/0131962 A1 | 7/2003 | Lindsay et al. | |
| 2004/0256066 A1 | 12/2004 | Lindsay et al. | |
| 2011/0247775 A1* | 10/2011 | Sutman ............... | D21H 17/29 162/164.6 |

FOREIGN PATENT DOCUMENTS

| | | |
|---|---|---|
| EP | 1 942 226 | 7/2008 |
| EP | 1 641 875 | 2/2011 |
| FR | 2 434 821 | 3/1980 |
| WO | 93/10305 | 5/1993 |
| WO | 95/18157 | 7/1995 |
| WO | 98/24972 | 6/1998 |
| WO | 99/18288 | 4/1999 |
| WO | 00/49226 | 8/2000 |
| WO | 01/86067 | 11/2001 |
| WO | 01/96403 | 12/2001 |
| WO | 03/087473 | 3/2003 |
| WO | 2004/061235 | 7/2004 |
| WO | 2006/090076 | 8/2006 |
| WO | 2009/059725 | 5/2009 |
| WO | 2011/117177 | 9/2011 |
| WO | 2011/127268 | 10/2011 |

OTHER PUBLICATIONS

International Search Report dated Sep. 16, 2013, corresponding to PCT/FR2013/051603.

\* cited by examiner

*Primary Examiner* — Mark Halpern
(74) *Attorney, Agent, or Firm* — Young & Thompson

(57) ABSTRACT

Mixtures of polyvinylamines and of liquid compositions of cationic amylaceous materials having very specific characteristics in terms of dry matter, viscosity, nitrogen content and pH. With such mixtures, it is possible to produce preparations that are particularly effective at increasing the dry strength of paper and cardboard. Also, the use of such mixtures for the production of paper and cardboard, the corresponding production method and the resulting paper and cardboard.

9 Claims, No Drawings

MIXTURES OF POLYVINYLAMINES AND OF LIQUID COMPOSITIONS OF CATIONIC AMYLACEOUS MATERIALS AS AGENTS FOR IMPROVING THE DRY STRENGTH OF PAPER AND CARDBOARD

This application is a 371 of PCT/FR2013/051603 filed 5 Jul. 2013

The present invention relates to mixtures of polyvinylamines and liquid compositions of cationic starchy materials having very particular solids content, viscosity, nitrogen content and pH characteristics. Through this selection, preparations that prove particularly effective for increasing the dry strength of papers or cardboards are successfully manufactured.

The dry strength of a paper or of a cardboard denotes its ability to withstand, once dry, a mechanical tensile or stretching action. This property is particularly desired in the packaging industry. Conventionally, dry strength agents are introduced into what is known as the wet end of the manufacture of the paper sheet. In concrete terms, these agents are added to the fiber suspension, before the formation of the actual sheet.

It is well known to use water-soluble cationic polymers to improve the strength characteristics of paper. Due to their nature, they can be attached directly to the anionic cellulose and give it a cationic charge so that, in combination with anionic polymers, there is attachment of the latter to the cellulose fibers, thus improving the dry strength of the sheet.

Among the cationic polymers commonly used, mention may be made of the compounds of polyamide-epichlorohydrin (PAE) or polyamideamine-epichlorohydrin (PAAE) type or else cationic polyacrylamides as described in the technological background of document WO 2006/090076.

But the products most commonly used for improving this dry strength are probably the liquid compositions of cationic starchy materials, it being possible for said cationic starchy materials to optionally be modified. The latter expression is understood to denote aqueous solutions containing at least one cationic starch, this starch having been optionally modified. Reference may be made to document WO 2011/117177 which describes, for this usage, a mixture of compounds based on aluminum and on cationic starch graft polymers, document WO 03/087473 which proposes, for this same functionality, combining an anionic resin with a cationic starch, or else document WO 01/86067 which demonstrates a synergy between a styrene/maleic acid copolymer and cationic starch.

In addition to these species, among which cationic starch is the most widely represented industrially, another family of cationic compounds has caught the attention of those skilled in the art: that of polyvinylamines. Initially known for providing filler retention, these compounds have been the subject of studies which have demonstrated their functionality as an agent improving the dry strength of paper ("Some properties of newsprint impregnated with polyvinylamine", Solutions & Tappi Journal, December 2002, Vol. 1 (10)).

Application examples thereof are found in document EP 1 942 226 which describes an electrolyte based on a complexing agent and on a polyvinylamine, in document WO 2009/059725 which proposes to use a reactive cellulose functionalized by a polyvinylamine or in document WO 2004/061235 which features a mixture between a polyvinylamine and an anionic compound or an aldehyde functional compound.

Therefore, and quite obviously, a person skilled in the art has come to combine polyvinylamines with cationic starchy materials. This is the subject of document WO 2011/127268, which describes such combinations containing at least 40% by weight of solids and, with respect to the total weight of polymer, from 55% to 90% by weight of cationic starch, and from 10% to 45% by weight of polyvinylamine.

This document asserts that such compositions are stable and limpid while resulting in dry strength values that are improved with respect to the use of polyvinylamine alone. It singles out waxy maize as the preferred source of cationic starch. However, reading table III demonstrates that the dry strength is only improved by 8% at most with respect to a commercial reference, and that it is even sometimes lower than the latter (example 1-4).

Consequently, doubt remains regarding the capacity of all the combinations proposed in document WO 2011/127268 to effectively improve the dry strength of a paper. At the same time, although some of these compositions really do increase the latter property, they only do so to a lesser extent: there is an unmet need, as regards compositions of this type, to improve paper dry strength much more significantly.

Starting from this observation and carrying out studies to overcome this shortcoming, the Applicant has succeeded in developing novel preparations containing at least one polyvinylamine and at least one cationic starchy material, that are both stable and limpid, and that result above all in paper dry strength values that are higher than those obtained with the compositions exemplified in the aforementioned document, and are much higher than those obtained with a commercial reference.

These preparations are characterized, inter alia, in that the cationic starchy material that it contains is derived from a very particular cationic starchy material liquid composition. The latter has:
 a solids content by weight at least equal to 10%, preferably of between 10% and 50%,
 a viscosity, determined according to a test T, of greater than 200 mPa·s and at most equal to 1000 mPa·s,
 a total nitrogen content at least equal to 0.6% and at most equal to 1.6%, these percentages being expressed by dry weight relative to the dry weight of composition,
 a pH below 9, preferably between 3.5 and 8.5.

The test T, used for measuring the viscosity of a liquid composition of starchy material, consists firstly in determining, via any conventional method within the reach of a person skilled in the art, the solids content of said composition. Following which, the solids content is adjusted so that it is equal to 10%. Finally, the Brookfield viscosity of the composition in question, the one therefore having an SC of 10%, is measured at 25° C. and at 20 rpm.

As shown by the tests that support the present application, it is the selection of such parameters that results in mixtures with polyvinylamines that are particularly effective as agents for improving the dry strength of papers. Not only is this strength improved with respect to the use of polyvinylamine alone, but also with respect to combinations of commercial products, this improvement being much more pronounced than that obtained with the combinations described in the aforementioned document WO 2011/127268.

One of the merits of the Applicant is having been able to identify the most suitable liquid composition of cationic starchy material among the very many that are available on the market today. In this regard, mention may be made of the products sold by RAISIO® under the name Raifix®. They are derived from a technology described in its patents WO 93/10305, WO 95/18157, WO 98/24972 and WO 99/18288. This technology generally consists of the preparation and application of highly cationic potato starch adhesives obtained from reaction media having high solids contents (SC>50%), around half of which is provided by the sole cationization reagent. This preparation involves a prior step of oxidation of the starchy material by hydrogen peroxide. The fixed nitrogen content of the compositions, the use of which is preferentially recommended, is generally greater than 2% and usually lies between 2.5% and 5%.

Also on the market are cationic starchy compositions sold by RAISIO@ under the name Raibond® 15 or Raisabond® 15 and which are less cationic than the aforementioned Raifix® compositions. However, they have a fixed nitrogen content which is still high, namely usually at least around 1.6%. Their pH also remains high, namely greater than 9. To the Applicant's knowledge, other liquid cationic starchy compositions are or have been proposed to manufacturers and which, conversely, have a relatively low nitrogen content, namely less than 0.5%. This is in particular the case for the composition Redisize® 132 sold by NATIONAL STARCH® corresponding to a solution containing 8% of cationic waxy maize starch that can be used for the preparation of sizing agent compositions as described in U.S. Pat. No. 6,296,696. These weakly cationic products are generally derived from bases rich in amylopectin (waxy starches) and may have a branched structure as described in document WO 00/49226.

The Applicant lastly indicates that it has filed 2 patent applications EP 1 641 875 and WO 01/96403. The first of them relates to a cationic starchy composition which is that used in the mixtures with a polyvinylamine according to the present invention: it therefore describes the characteristics of solids content, viscosity, nitrogen content and pH as signified above. The second one relates to cationic starchy compositions having a nitrogen content at most equal to 2%, and a very low viscosity, namely less than 1600 mPa·s for an SC adjusted to 20%. As established by the Applicant in document EP 1 641 875, this viscosity, if it had been measured for an SC adjusted to 10% (instead of 20%), would have been (much) less than 200 mPa·s.

Therefore, a first subject of the present invention consists of a mixture of at least one polyvinylamine and of at least one liquid composition of cationic starchy materials, in a ratio between 55 to 90 parts by dry weight of polyvinylamine per 10 to 45 parts by dry weight of cationic starchy material, characterized in that the liquid composition of cationic starchy materials has:
- a solids content by weight of between 10% and 50%,
- a viscosity, determined according to a test T, of greater than 200 mPa·s and at most equal to 1000 mPa·s,
- a total nitrogen content at least equal to 0.6% and at most equal to 1.6%, these percentages being expressed by dry weight relative to the dry weight of composition,
- a pH below 9.

The term mixture refers here to the composition that contains at least one polyvinylamine and at least one liquid composition of cationic starchy materials having the characteristics listed above.

The cationic starchy materials are in particular obtained by hydrolysis, preferably by enzymatic hydrolysis.

This mixture is also characterized in that it has a total solids content of between 5% and 30% by weight, preferably between 10% and 25% by weight.

This mixture is also characterized in that it has a preferred ratio of between 60 to 80 parts by dry weight of polyvinylamine per 20 to 40 parts by dry weight of cationic starchy material.

This mixture is also characterized in that the liquid composition of cationic starchy materials has a solids content by weight preferably of between 10% and 30%.

This mixture is also characterized in that the liquid composition of cationic starchy materials has a pH between 3.5 and 8.5.

This mixture is also characterized in that the starchy materials originate from tuber or root starch, maize, wheat, pea or mixtures thereof; tuber or root starch, in particular potato starch, being preferred in the present invention.

This mixture is also characterized in that the polyvinylamine comprises at least one vinylamine polymer selected from vinylamine homopolymers and terpolymers, vinylformamide-based polymers, said polymers being optionally modified after polymerization and said polymers being completely or partially neutralized or else in acid form.

Another subject of the present invention consists of a process for manufacturing a mixture of at least one polyvinylamine and of at least one cationic starchy material, in a ratio between 55 to 90 parts by dry weight of polyvinylamine per 10 to 45 parts by dry weight of cationic starchy material, characterized in that at least one polyvinylamine is mixed with at least one liquid composition of cationic starchy materials having:
- a solids content by weight of between 10% and 50%,
- a viscosity, determined according to a test T, of greater than 200 mPa·s and at most equal to 1000 mPa·s,
- a total nitrogen content at least equal to 0.6% and at most equal to 1.6%, these percentages being expressed by dry weight relative to the dry weight of composition,
- a pH below 9.

Within the context of this process, the liquid composition of cationic starchy materials has all the characteristics which have been listed above. These also apply to the polyvinylamine.

Another subject of the present invention is the use of the aforementioned mixtures, as agent for improving the dry strength of a paper or of a cardboard.

Another subject of the present invention consists of a process for manufacturing a paper or cardboard by using the aforementioned mixtures.

A final subject of the present invention consists of a paper or cardboard manufactured from the aforementioned mixtures.

The examples that follow will make it possible to better understand the present invention, without however limiting the scope thereof.

EXAMPLES

Example 1

This example relates solely to the preparation and description of various cationic starchy material compositions that will subsequently be used.

Starchy Material Composition No. 1 (SMC 1)

This is a composition that complies with the present invention. A potato starch powder having a total nitrogen content of 1.2% (dry/dry) and obtained in the dry phase in accordance with the patent FR 2 434 821 in the name of the Applicant, is mixed with and suspended in cold demineralized water so as to obtain a cationic starch suspension containing 11.5% solids. Various samples of said suspension are treated, in an open vessel, with variable amounts of α-amylase and/or with different operating conditions (in particular conversion temperature, duration), the objective being to be able to obtain a cationic starchy composition having a Brookfield viscosity (measured at 25° C. and at 20 rpm) of around 250 to 300 mPa·s and an SC of 10% or very slightly higher. A liquid cationic starchy composition was thus obtained having a solids content (SC) of 10.2%, a Brookfield viscosity (25° C.-20 rpm) of 330 mPa·s (i.e. of 290 mPa·s according to the test T after adjustment of the SC to 10%), a total nitrogen content of 1.2% and a pH of 5.3.

Starchy Material Composition No. 2 (SMC 2)

This is a composition that complies with the present invention. A potato starch powder having a total nitrogen content of 0.8% (dry/dry) and obtained in the dry phase in accordance with the patent FR 2 434 821 in the name of the Applicant, is mixed with and suspended in cold demineralized water so as to obtain a cationic starch suspension containing 22% solids. Various samples of said suspension are treated, in an open vessel, with variable amounts of α-amylase and/or with different operating conditions (in particular conversion temperature, duration), the objective being to be able to obtain a cationic starchy composition having a Brookfield viscosity (measured at 25° C. and at 20 rpm) of around 2500 to 3000 mPa·s and an SC close to 20%. A liquid cationic starchy composition was thus obtained having a solids content (SC) of 19.7%, a Brookfield viscosity (25° C.-20 rpm) of 2580 mPa·s (i.e. of 350 mPa·s according to the test T after adjustment of the SC to 10%), a total nitrogen content of 0.8% and a pH of 5.1.

Starchy Material Composition No. 3 (SMC 3)

This is a composition of the prior art. It is a liquid cationic starchy composition with a solids content of around 20%, identical to the composition (2) used in example 4 of patent WO 01/96403 and therefore having a low viscosity (100 mPa·s at an adjusted SC of 20%), a total nitrogen content of 1.5% (dry/dry) and a pH of 5.8.

Starchy Material Composition No. 4 (SMC 4)

This is a composition of the prior art. It is a commercial liquid cationic starchy composition having a solids content of around 19%, a total nitrogen content of 1.75% (dry/dry), a Brookfield viscosity (25° C.-20 rpm) of 650 mPa·s (i.e. of 120 mPa·s after adjustment of its SC to 10% according to the test T) and a pH of 11.

Example 2

This example relates to the preparation of various mixtures between a commercial polyvinylamine which is the product Hercobond® 6363 (HERCULES®) referred to as PVAm (solids content of around 28%) and the cationic starchy compositions targeted in example 1. This polyvinylamine is among the 2 products illustrated in document WO 2011/127268.

The mixtures are prepared by stirring at ambient temperature for around 15 minutes. Their pH is at the end adjusted to 7 by addition of HCl. The composition of each mixture (ratio by dry weight of polyvinylamine with respect to the starchy material) is indicated in table 1.

TABLE 1

|  | (PVAm/CMA) ratio (dry weight) | SC (%) |
|---|---|---|
| mixture 1 | 70 (PVAm)/30 (SMC 1) | 15.5 |
| mixture 2 | 70 (PVAm)/30 (SMC 2) | 22.4 |
| mixture 3 | 70 (PVAm)/30 (SMC 3) | 22.4 |
| mixture 4 | 70 (PVAm)/30 (SMC 4) | 21.7 |

TABLE 1-continued

|  | (PVAm/CMA) ratio (dry weight) | SC (%) |
|---|---|---|
| mixture 5 | 65 (PVAm)/35 (SMC 1) | 16.4 |
| mixture 6 | 65 (PVAm)/35 (SMC 2) | 22.8 |
| mixture 7 | 65 (PVAm)/35 (SMC 3) | 22.8 |
| mixture 8 | 65 (PVAm)/35 (SMC 4) | 22.1 |

Visually, and over a period of 1 month of storage at ambient temperature, no segregation or sedimentation phenomenon was observed for mixtures 1 to 8: these mixtures are therefore perfectly stable.

Example 3

This example relates to the manufacture of paper sheets, by the use of the mixtures of example 2, in the wet end of the sheet production.

The sheets were produced on a papermaking machine with the following characteristics:
the pulp used is 100% recycled; it has a hardness of 25 ppm, an alkalinity of 25 ppm, and a conductivity of around 2000 μS/cm,
the pH of the system is 7, the freeness value is 380 CSF at the temperature of 50° C.,
the weight is 45 kg per 280 m²,
use was finally made of 0.3% by dry weight of polymer (polyvinylamine alone or polyvinylamine as a mixture with a starch) relative to the dry weight of pulp, as dry strength agent, introduced as a mixture with the pulp.

For each sheet of paper produced, its dry strength (dry tensile) was determined according to the method well known to a person skilled in the art and under the same conditions as those described in document WO 2011/127268. A reference test consists of polyvinylamine alone, the level of which is arbitrarily set at 100. The results have been reported in table 2.

All of the mixtures reveal a synergy with respect to the polyvinylamine used alone, which had already been observed in document WO 2011/127268. The mixtures containing cationic starchy compositions according to the prior art (tests 3, 4, 7 and 8) give rise to a modest increase in the dry strength of the paper, between 5% and 8%, which is of the same order of magnitude as the results obtained in document WO 2011/127268. On the other hand, it appears here, in a novel and particularly advantageous manner, that the use of mixtures containing liquid cationic starchy compositions according to the invention (tests 1, 2, 5 and 6) very substantially increases the dry strength of the paper: by 20% to 22% with respect to the reference.

TABLE 2

| TEST | ADDITIVE | DRY STRENGTH |
|---|---|---|
| Reference | PVAm | 100 |
| test 1 | mixture 1 | 121 |
| test 2 | mixture 2 | 120 |
| test 3 | mixture 3 | 108 |
| test 4 | mixture 4 | 105 |
| test 5 | mixture 5 | 122 |
| test 6 | mixture 6 | 120 |
| test 7 | mixture 7 | 107 |
| test 8 | mixture 8 | 105 |

The invention claimed is:

1. A mixture of at least one polyvinylamine and of at least one liquid composition of cationic starchy materials, in a ratio between 55 to 90 parts by dry weight of polyvinylamine per 10 to 45 parts by dry weight of cationic starchy material, wherein the liquid composition of cationic starchy materials has:
- a solids content by weight of between 10% and 50%,
- a viscosity—of greater than 200 mPa·s and at most equal to 350 mPa·s, said viscosity being determined by adjusting the solids content of the liquid composition of cationic starchy material to 10% and then measuring the Brookfield viscosity at 25° C. and at 20 rpm,
- a total nitrogen content at least equal to 0.6% and at most equal to 1.6%, these percentages being expressed by dry weight relative to the dry weight of composition,
- a pH below 9, and
- wherein said cationic starchy material is obtained by enzymatic hydrolysis.

2. The mixture as claimed in claim 1, wherein the mixture has a total solids content of between 5% and 30% by weight.

3. The mixture as claimed in claim 1, wherein the ratio is between 60 to 80 parts by dry weight of polyvinylamine per 20 to 40 parts by dry weight of cationic starchy material.

4. The mixture as claimed in claim 1, wherein the liquid composition of cationic starchy materials has a solids content by weight of between 10% and 30%.

5. The mixture as claimed in claim 1, wherein the liquid composition of cationic starchy materials has a pH between 3.5 and 8.5.

6. The mixture as claimed in claim 1, wherein the polyvinylamine comprises at least one vinylamine polymer selected from vinylamine homopolymers and terpolymers, vinylformamide-based polymers, said polymers being optionally modified after polymerization and said polymers being completely or partially neutralized or else in acid form.

7. A process for manufacturing a mixture of at least one polyvinylamine and of at least one cationic starchy material, in a ratio between 55 to 90 parts by dry weight of polyvinylamine per 10 to 45 parts by dry weight of cationic starchy material, characterized in that at least one polyvinylamine is mixed with at least one liquid composition of cationic starchy materials having:
- a solids content by weight of between 10% and 50%,
- a viscosity, determined according to a test T, of greater than 200 mPa·s and at most equal to 350 mPa·s,
- a total nitrogen content at least equal to 0.6% and at most equal to 1.6%, these percentages being expressed by dry weight relative to the dry weight of composition,
- a pH below 9, and
- wherein said cationic starchy material is obtained by enzymatic hydrolysis.

8. A process for manufacturing a paper or cardboard by using the mixtures as claimed in claim 1.

9. A paper or cardboard manufactured from the mixtures as claimed in claim 1.

* * * * *